US012763844B2

(12) United States Patent
Pal et al.

(10) Patent No.: US 12,763,844 B2
(45) Date of Patent: Oct. 13, 2026

(54) CONTROL SYSTEM AND METHOD FOR CONTROLLING AN ANTENNA OF A VEHICLE

(71) Applicant: Honeywell International Inc., Charlotte, NC (US)

(72) Inventors: Subhadeep Pal, Ottawa (CA); Thomas Nugent, Ottawa (CA); Saravanakumar Gurusamy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 254 days.

(21) Appl. No.: 18/618,275

(22) Filed: Mar. 27, 2024

(65) Prior Publication Data

US 2025/0233648 A1 Jul. 17, 2025

(30) Foreign Application Priority Data

Jan. 17, 2024 (IN) ............................ 202411003283

(51) Int. Cl.
*H04B 7/185* (2006.01)
*H01Q 1/28* (2006.01)

(52) U.S. Cl.
CPC ......... *H04B 7/18508* (2013.01); *H01Q 1/288* (2013.01)

(58) Field of Classification Search
CPC ...... H04B 7/18508; H01Q 1/288; H01Q 1/24; H01Q 1/28; H01Q 1/3216; H01Q 1/34
(Continued)

(56) References Cited

U.S. PATENT DOCUMENTS 4,999,780 A 3/1991 Mitchell
5,214,505 A 5/1993 Rabowsky et al.
(Continued)

FOREIGN PATENT DOCUMENTS

CA 2216672 C 6/2000
CN 111475926 A 7/2020
(Continued)

OTHER PUBLICATIONS

Gao, "Files Delivery and Share Optimization in LEO Satellite-Terrestrial Integrated Networks: A NOMA Based Coalition Formation Game Approach," IEEE Transactions on Vehicular Technology Year: 2022 (Year: 2022).*
(Continued)

*Primary Examiner* — Juan A Torres
(74) *Attorney, Agent, or Firm* — Alston & Bird LLP

(57) ABSTRACT

In various aspects, a control system for controlling an antenna of a vehicle is provided. The control system may include a satellite communication system (SATCOM) that includes the antenna, which may emit RF signals. The SATCOM may be configured to operate in a plurality of modes. The plurality of modes may include a low power mode and a high power mode. A strength of the RF signals emitted by the antenna may be greater when the SATCOM is operating in the high power mode than when the SATCOM is operating in the low power mode. The control system may be configured to switch the SATCOM from the high power mode to the low power mode when a distance between the vehicle and at least one other vehicle is or is predicted to be less than or equal to a threshold value.

20 Claims, 8 Drawing Sheets

(58) Field of Classification Search
USPC ............... 455/427, 422.1; 342/352; 343/700; 370/316
See application file for complete search history.

(56) References Cited

U.S. PATENT DOCUMENTS

| | | | | |
|---|---|---|---|---|
| 5,713,075 | A | 1/1998 | Threadgill et al. | |
| 6,198,390 | B1 | 3/2001 | Schlager et al. | |
| 6,334,344 | B1 | 1/2002 | Bonhoure et al. | |
| 6,385,513 | B1 | 5/2002 | Murray et al. | |
| 7,941,248 | B1 | 5/2011 | Tsamis et al. | |
| 8,228,911 | B2 | 7/2012 | Cheriyath et al. | |
| 8,478,461 | B2 | 7/2013 | Khatwa et al. | |
| 9,318,025 | B2 | 4/2016 | Conner et al. | |
| 9,704,405 | B2 | 7/2017 | Kashi et al. | |
| 9,742,486 | B2 | 8/2017 | Cross | |
| 10,049,508 | B2 | 8/2018 | Jensen et al. | |
| 10,163,328 | B2 * | 12/2018 | Bekanich | G08B 25/006 |
| 10,164,705 | B1 | 12/2018 | Bowen et al. | |
| 10,343,631 | B2 | 7/2019 | Poeppel et al. | |
| 10,569,899 | B2 | 2/2020 | Deseure et al. | |
| 10,725,184 | B2 | 7/2020 | Farmer et al. | |
| 10,852,445 | B2 | 12/2020 | Zhu et al. | |
| 11,251,862 | B2 | 2/2022 | Zhou et al. | |
| 11,617,218 | B2 | 3/2023 | Thommana et al. | |
| 2002/0045444 | A1 | 4/2002 | Usher et al. | |
| 2003/0227395 | A1 | 12/2003 | Zeineh | |
| 2004/0229607 | A1 | 11/2004 | La et al. | |
| 2007/0067093 | A1 | 3/2007 | Pepitone | |
| 2010/0318834 | A1 | 12/2010 | Planche | |
| 2014/0104051 | A1 | 4/2014 | Breed | |
| 2015/0045994 | A1 | 2/2015 | Krishna et al. | |
| 2015/0222351 | A1 | 8/2015 | Judd et al. | |
| 2015/0235559 | A1 | 8/2015 | Alekseev et al. | |
| 2016/0063869 | A1 | 3/2016 | Kathirvel et al. | |
| 2016/0363456 | A1 | 12/2016 | Pujos et al. | |
| 2017/0069214 | A1 | 3/2017 | Dupray et al. | |
| 2017/0358851 | A1 | 12/2017 | Diamond et al. | |
| 2018/0170573 | A1 | 6/2018 | Wang et al. | |
| 2018/0240324 | A1 | 8/2018 | Bekanich | |
| 2020/0027358 | A1 | 1/2020 | Fine | |
| 2020/0326431 | A1 | 10/2020 | Østergaard | |
| 2020/0389193 | A1 | 12/2020 | Brandao | |
| 2021/0058143 | A1 | 2/2021 | Muren et al. | |
| 2021/0225181 | A1 | 7/2021 | Feyereisen et al. | |
| 2022/0021443 | A1 | 1/2022 | Zhou et al. | |
| 2022/0123570 | A1 | 4/2022 | Fuchs et al. | |
| 2022/0123827 | A1 | 4/2022 | Levy et al. | |
| 2023/0070608 | A1 | 3/2023 | Sumien | |
| 2023/0091772 | A1 | 3/2023 | Frye | |
| 2023/0120473 | A1 | 4/2023 | Ji et al. | |
| 2025/0103057 | A1 | 3/2025 | Jewell et al. | |
| 2025/0173278 | A1 * | 5/2025 | Cawse | G08C 17/02 |
| 2025/0232679 | A1 * | 7/2025 | Pal | G08G 5/21 |

FOREIGN PATENT DOCUMENTS

| | | | |
|---|---|---|---|
| CN | 116080553 | A | 5/2023 |
| CN | 116367291 | A | 6/2023 |
| EP | 1841094 | A2 | 10/2007 |
| EP | 3211605 | A1 | 8/2017 |
| EP | 4589566 | A1 | 7/2025 |
| EP | 4589997 | A1 | 7/2025 |
| WO | 2022/199430 | A1 | 9/2022 |
| WO | 2025/059153 | A1 | 3/2025 |

OTHER PUBLICATIONS

Luca Cesarano et al., "A Real-Time Energy-Saving Mechanism in Internet of Vehicles Systems," IEEE Access, 9:157842-157858, (2021). [Retrieved from the Internet Nov. 22, 2024: URL: <https://ieeexplore.ieee.org/stamp/stamp.jsp?arnumber=9624984>].
Subhadeep Pal et al., U.S. Appl. No. 18/618,305 for "Control System and Method for Providing an Alert Indication", filed Mar. 27, 2024.
Extended European Search Report Mailed on Mar. 21, 2025 for EP Application No. 24223303, 12 page(s).
Extended European Search Report Mailed on Apr. 11, 2025 for EP Application No. 24223322, 13 page(s).
Non-Final Rejection Mailed on Nov. 20, 2025 for U.S. Appl. No. 18/618,305, 27 page(s).
Examiner Interview Summary Record (PTOL-413) Mailed on May 5, 2026 for U.S. Appl. No. 18/618,305, 1 page(s).
Notice of Allowance and Fees Due (PTOL-85) Mailed on May 5, 2026 for U.S. Appl. No. 18/618,305, 9 page (s).
Traffic_alert_and_collision_avoidance_systems2024 (Year: 2024).

* cited by examiner

CONTROL SYSTEM AND METHOD FOR CONTROLLING AN ANTENNA OF A VEHICLE

CROSS-REFERENCE TO RELATED APPLICATION

The present application claims priority to India Provisional Patent Application Serial No. 202411003283 filed Jan. 17, 2024, which is hereby incorporated by reference in its entirety.

TECHNICAL FIELD

The present application relates generally to a control system for controlling an antenna of a vehicle. More specifically, the present application relates to a control system for switching a mode of an antenna.

BACKGROUND

Vehicles, such as aircraft, are often equipped with an antenna to transmit and receive data and communication signals. However, when the vehicle is in close proximity to another vehicle, the radio frequency radiation emitted by the antenna may interfere with certain systems of the other vehicles, such as navigation systems. For example, aircraft are often equipped with precision approach systems that may be disrupted by radio frequency radiation emitted by an antenna of a nearby aircraft.

The inventors have identified numerous deficiencies and problems with the existing technologies in this field. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved control systems and methods for controlling an antenna of a vehicle.

In various aspects, a control system for controlling an antenna of a vehicle is provided. The control system may include a satellite communication system (SATCOM) that includes the antenna, which may emit RF signals. The SATCOM may be configured to operate in a plurality of modes. The plurality of modes may include a low power mode and a high power mode. A strength of the RF signals emitted by the antenna may be greater when the SATCOM is operating in the high power mode than when the SATCOM is operating in the low power mode. The control system may be configured to switch the SATCOM from the high power mode to the low power mode when a distance between the vehicle and at least one other vehicle is or is predicted to be less than or equal to a threshold value.

In various examples, the control system is configured to switch the SATCOM from the high power mode to the low power mode when (i) the vehicle is on the ground and (ii) the distance between the vehicle and the at least one other vehicle is or is predicted to be less than or equal to the threshold value.

In various examples, the control system is configured to switch the SATCOM from the low power mode to the high power mode when one or more distance(s) between the vehicle and all other vehicles within a vicinity of the vehicle is or is predicted to be greater than the threshold value.

In various examples, the control system includes an input/output (I/O) system. The I/O system may be configured to output an indication of a current operating mode of the SATCOM.

In various examples, the control system includes an input/output (I/O) system. The I/O system may be configured to allow input of a desired operating mode of the SATCOM.

In various examples, the control system includes an input/output (I/O) system. The control system may be configured to operate in an auto mode and in an override mode. The I/O system may be configured to allow a user to select between the auto mode and the override mode of the control system.

In various examples, when the control system is operating in the override mode, the control system is configured to allow the user to select between the high power mode and the low power mode of the SATCOM. An override SATCOM mode signal indicative of the user's selection may be transmitted to the SATCOM to switch between the high power mode and the low power mode.

In various examples, the control system includes an input/output (I/O) system. The I/O system may be configured to provide an alert indication when the SATCOM is operating in the high power mode and the distance between the vehicle and at least one other vehicle is or is predicted to be less than or equal to the threshold value.

In various examples, the control system includes a modem that is in electrical communication with the antenna. The modem may be configured to adjust the strength of the RF signals emitted by the antenna based on an operating mode of the SATCOM.

In various examples, the control system is configured to determine the threshold value at least in part on at least one RF property of the RF signals emitted by the antenna.

In various aspects, an aircraft includes a satellite communication system (SATCOM). The SATCOM may include an antenna configured to emit RF signals. The SATCOM may be configured to operate in a plurality of modes. The plurality of modes may include a low power mode and a high power mode. A strength of the RF signals emitted by the antenna may be greater when the SATCOM is operating in the high power mode than when the SATCOM is operating in the low power mode. The aircraft may include a control system that may be configured to switch the SATCOM from the high power mode to the low power mode when a distance between the aircraft and at least one other aircraft is or is predicted to be less than or equal to a threshold value.

In various examples, the control system is configured to switch the SATCOM from the high power mode to the low power mode when the aircraft switches from being not on the ground to being on the ground.

In various aspects, a method of controlling a satellite communication system (SATCOM) of a vehicle is provided. The SATCOM may include an antenna configured to emit RF signals. The method may include determining or receiving vehicle position data. The method may include determining or receiving traffic data. The method may include determining a distance or predicting a future distance between the vehicle and at least one other vehicle based at least in part on the vehicle position data and the traffic data. The method may include switching the SATCOM from a high power mode to a low power mode in response to determining that the distance is less than or equal to a threshold value.

In various examples, the method includes switching the SATCOM from the low power mode to the high power mode in response to determining that the distance is greater than the threshold value.

In various examples, the method includes determining that the vehicle is on the ground. The method may include switching the SATCOM from the high power mode to the low power mode in response to determining that the vehicle is on the ground and determining that the distance is less than or equal to the threshold value.

In various examples, the method includes determining that one or more distance(s) between the vehicle and all other vehicles within a vicinity of the vehicle is or is predicted to be greater than the threshold value. The method may include switching the SATCOM from the low power mode to the high power mode in response to the determining that the one or more distance(s) between the vehicle and all other vehicles within the vicinity of the vehicle is or is predicted to be greater than the threshold value.

In various examples, the method includes displaying on a graphical user interface (GUI) an indication of a current operating mode of the SATCOM.

In various examples, the method includes switching a control system for the SATCOM from an auto mode to an override mode in response to a user selecting the override mode.

In various examples, the method includes switching the SATCOM from the low power mode to the high power mode in response to the user selecting the high power mode or switching the SATCOM from the high power mode to the low power mode in response to the user selecting the low power mode.

In various examples, the method includes providing an alert indication in response to determining that the distance between the vehicle and at least one other vehicle is or is predicted to be less than or equal to the threshold value.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
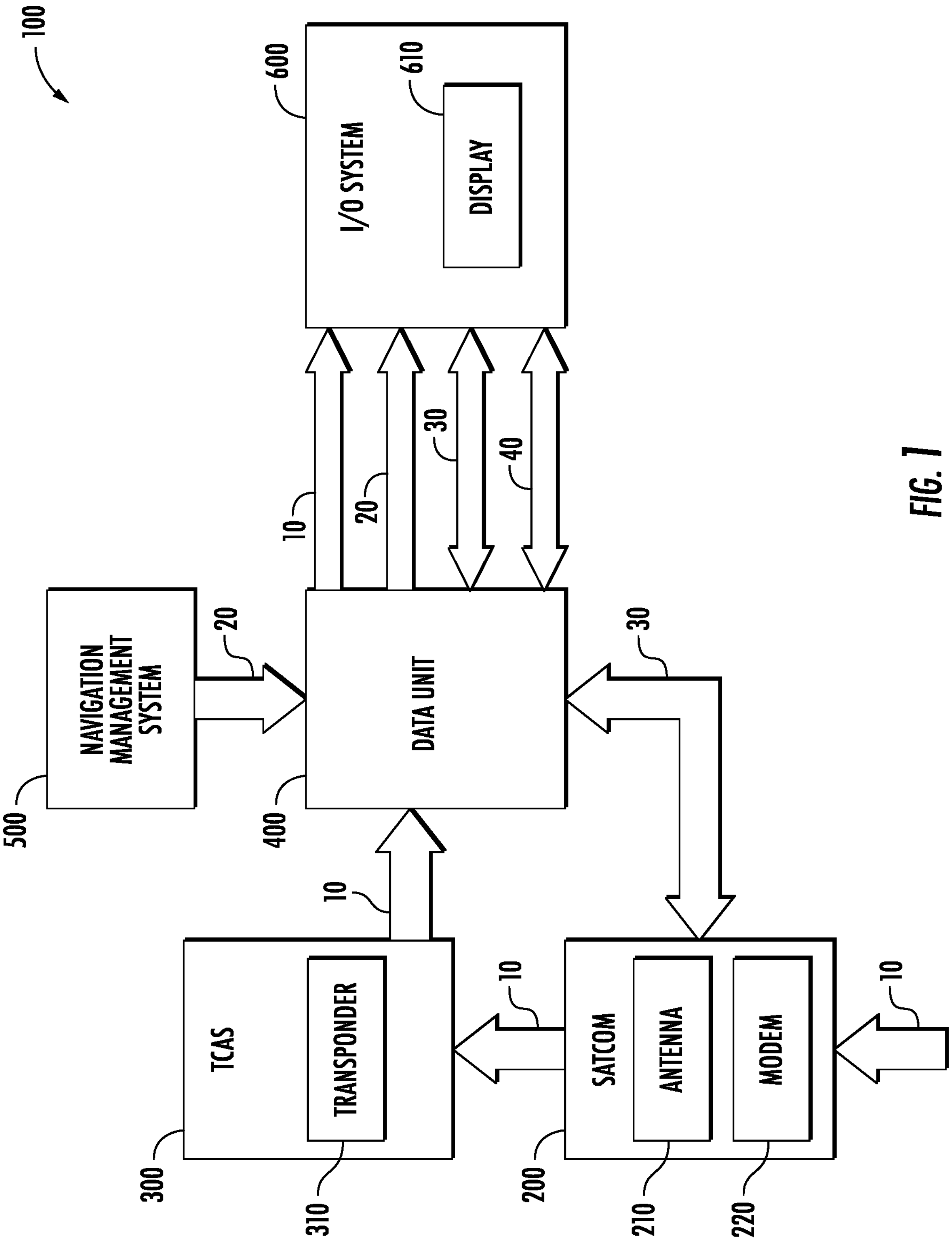

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a schematic view of a control system, in accordance with an example embodiment.

Figure 2A:
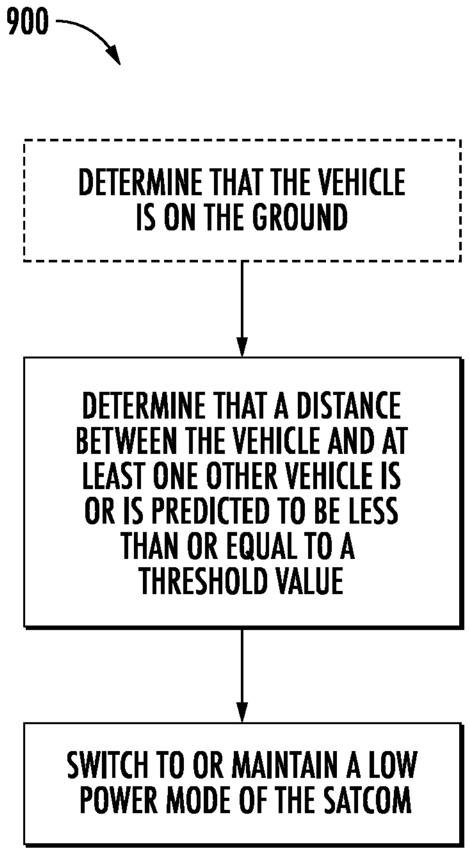

FIG. 2A provides a flow chart of a method for operating a control system, in accordance with an example embodiment.

Figure 2B:
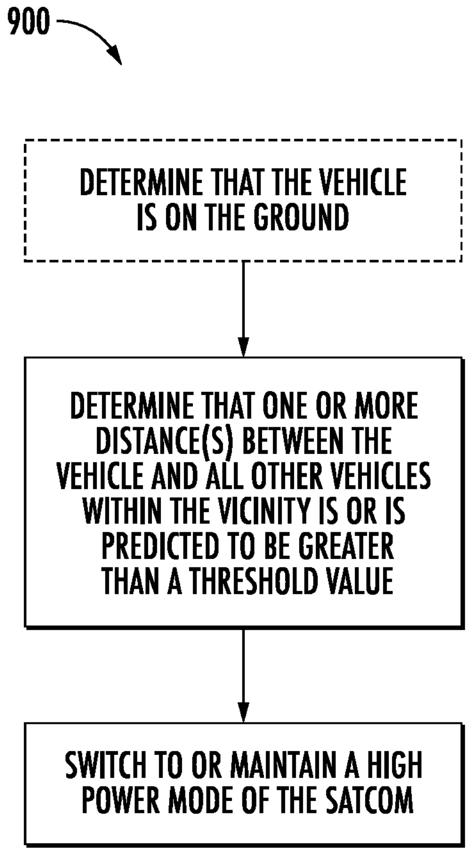

FIG. 2B provides a flow chart of a method for operating a control system, in accordance with an example embodiment.

Figure 2C:
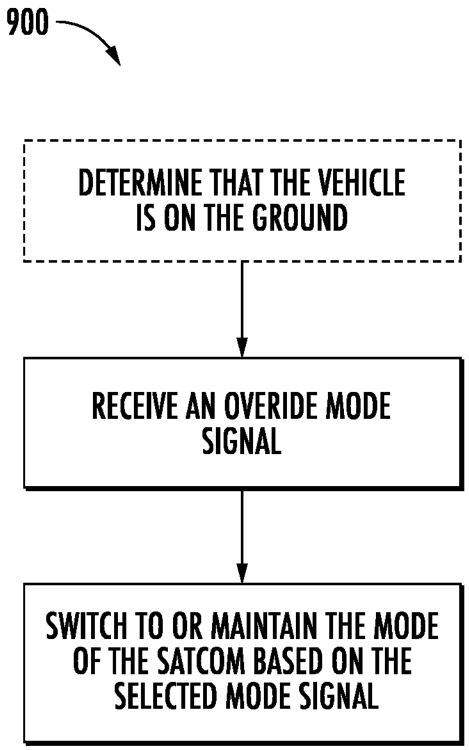

FIG. 2C provides a flow chart of a method for operating a control system, in accordance with an example embodiment.

Figure 2D:
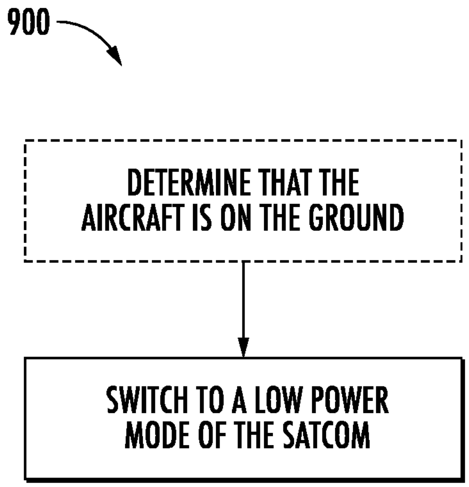

FIG. 2D provides a flow chart of a method for operating a control system, in accordance with an example embodiment.

Figure 3A:
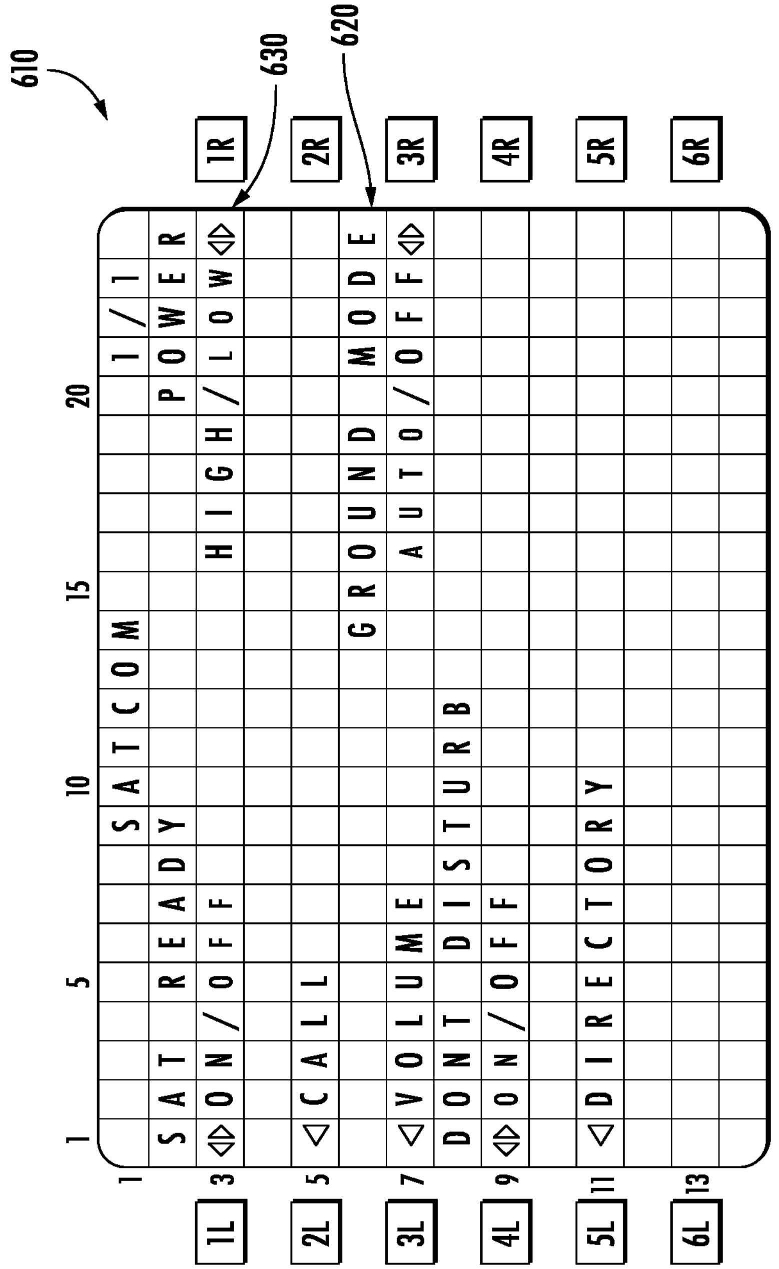

FIG. 3A provides a view of at least a portion of a graphical user interface of a display of a vehicle.

Figure 3B:
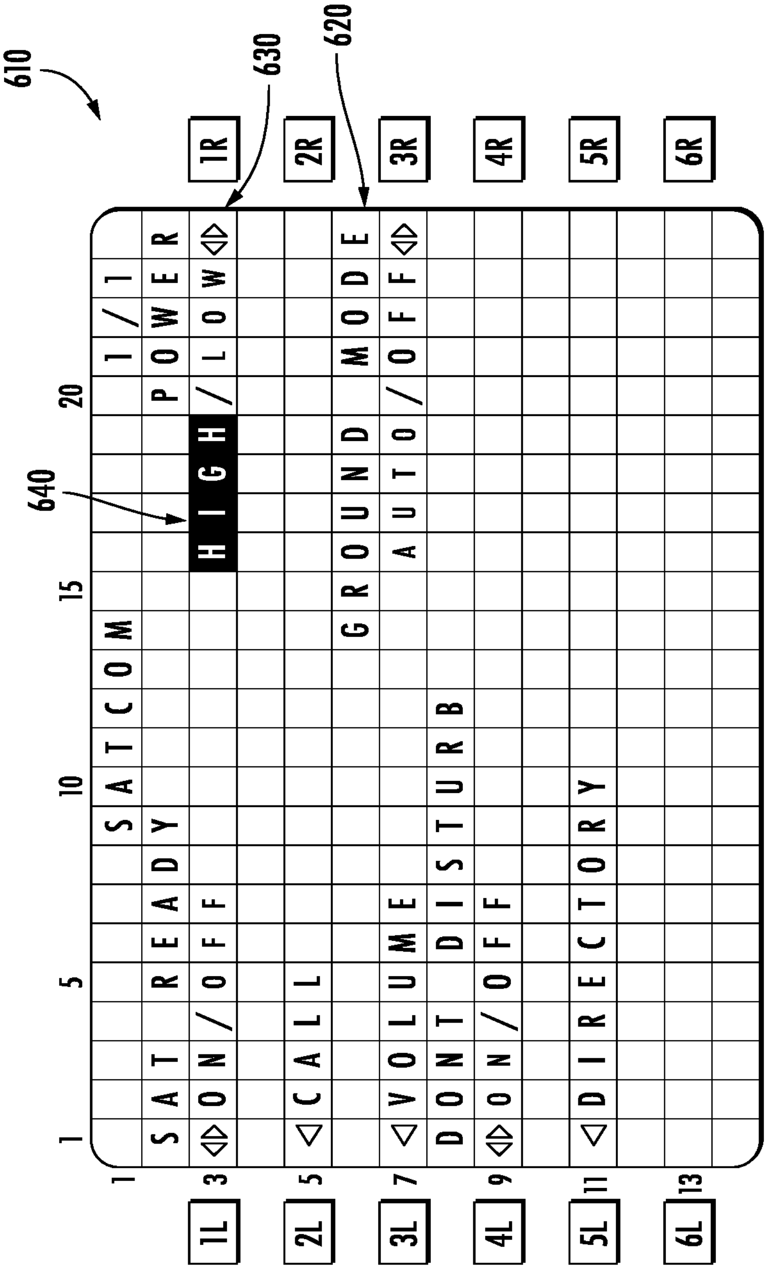

FIG. 3B provides a view of at least a portion of a graphical user interface of a display of a vehicle.

Figure 4:
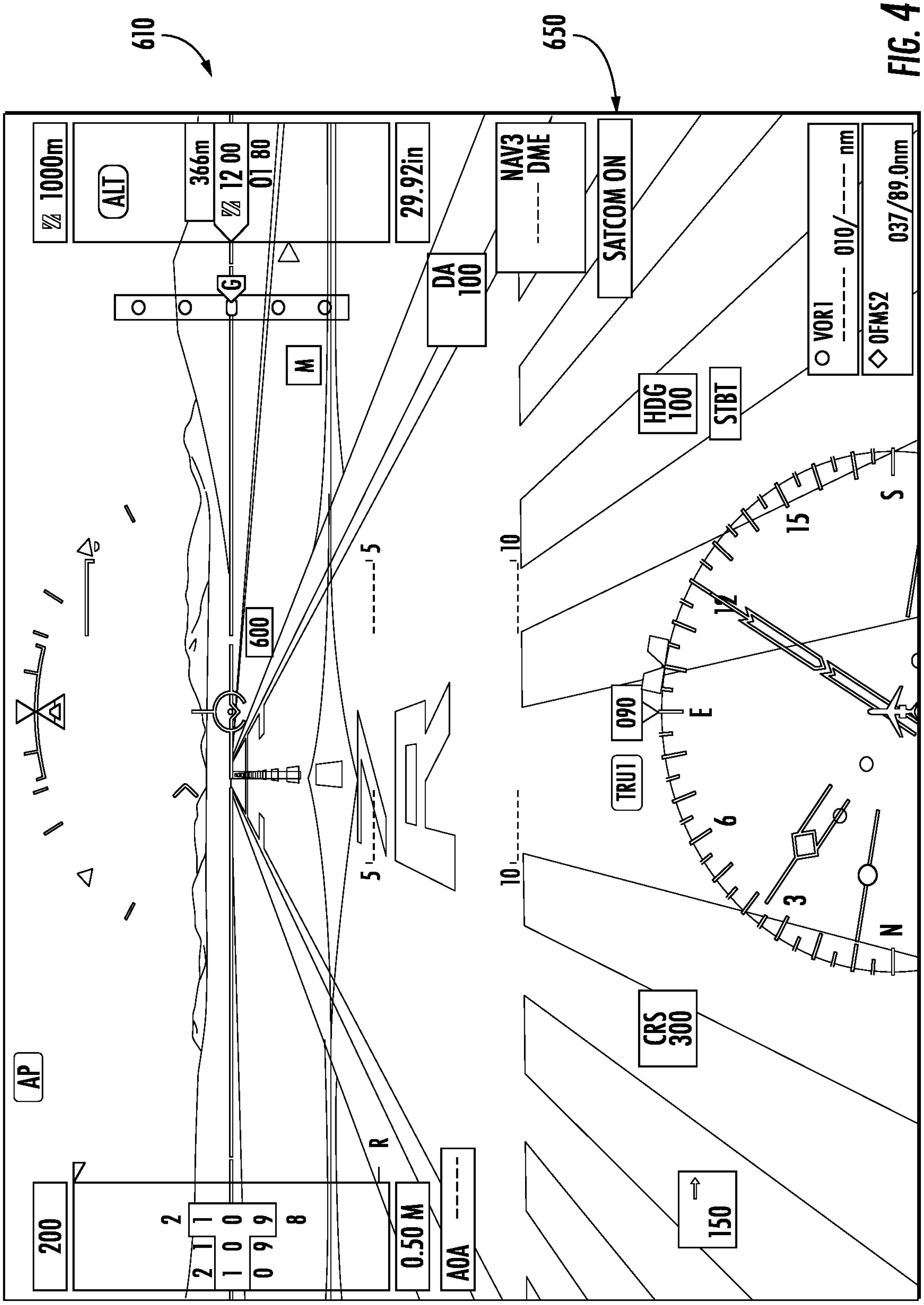

FIG. 4 provides a view of at least a portion of a graphical user interface of a display of a vehicle.

Figure 5A:
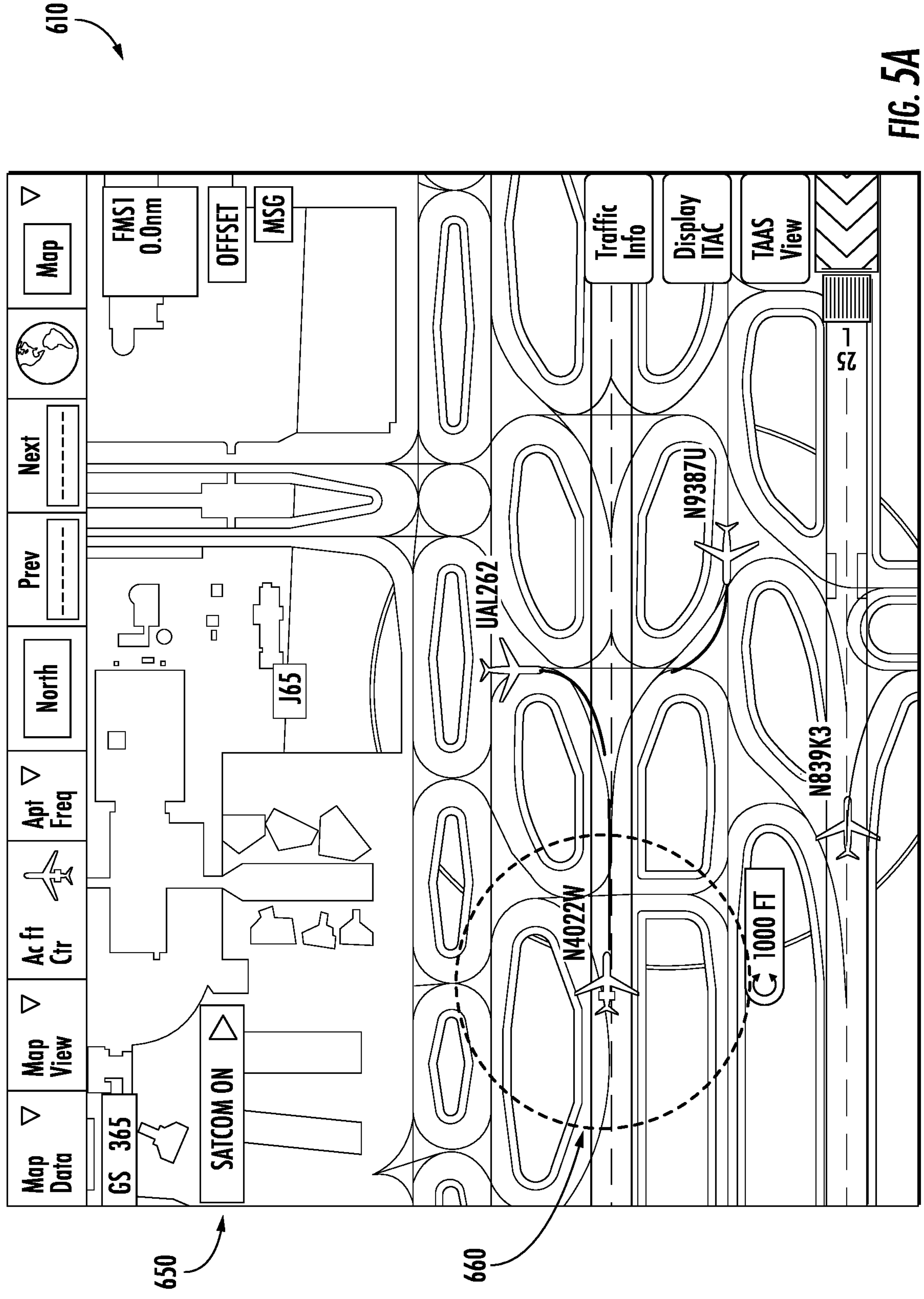

FIG. 5A provides a view of at least a portion of a graphical user interface of a display of a vehicle.

Figure 5B:
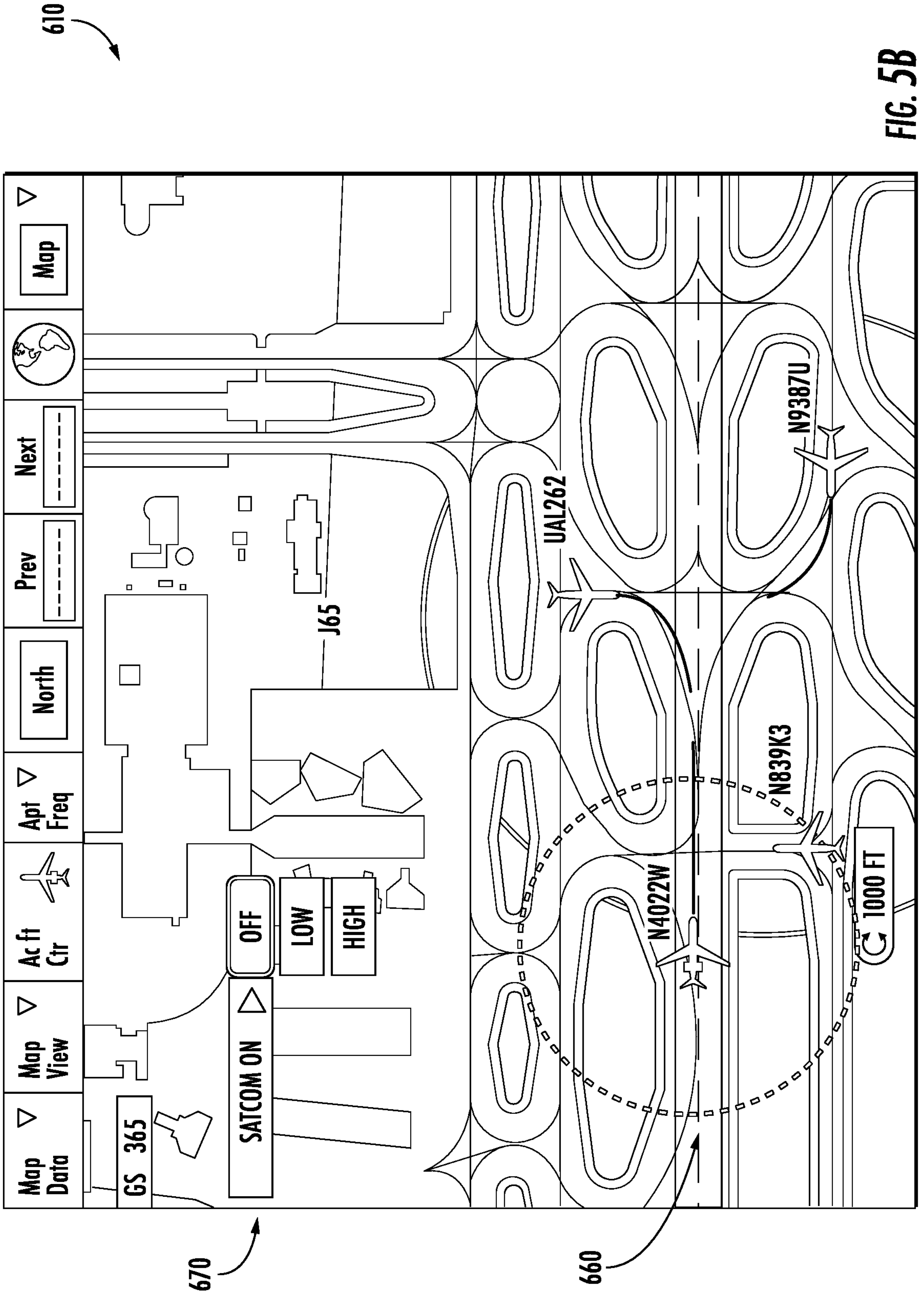

FIG. 5B provides a view of at least a portion of a graphical user interface of a display of a vehicle.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term “exemplary” means serving as an example, instance, or illustration. Any aspect or design described herein as “exemplary” is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms “includes” and “including” and variants thereof are used in either the detailed description or the claims, these terms are intended to be inclusive in a manner similar to the term “comprising.”

As used herein, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

As used herein, the term "system" refers to, or includes, a computer-related entity or an entity related to an operational apparatus with one or more specific functionalities, wherein the entity can be either hardware, a combination of hardware and software, software, or software in execution. As an example, a system may be, but is not limited to being, a process running on a processor, a processor, an object, an executable, a thread of execution, computer-executable instructions, a program, and/or a computer. By way of illustration and not limitation, both an application running on a server and the server can be a system.

As used herein, the term "electrical communication" means that an electric current and/or an electric signal are capable of making the connection between the areas specified.

As used herein, the term "vicinity" may refer an area surrounding a vehicle. For example, the vicinity may refer to the area around the vehicle that is within two-thousand feet, such as within one-thousand feet, such within eight hundred feet.

As used herein, terms of approximation, such as "approximately," "substantially," or "about," refer to being within manufacturing or engineering tolerances. For example, terms of approximation may refer to being within a five percent margin of error.

Referring now to FIG. 1, a schematic view of a control system 100 for controlling a strength of radio frequency (RF) signals emitted by an antenna 210 of a vehicle is provided, in accordance with an example embodiment. In various examples, the vehicle is an aircraft, such as a rotorcraft, an airplane, or a drone. In various other examples, the vehicle is a land craft, such as a car, or a watercraft, such as a ship or a boat. The control system 100 can be positioned on the vehicle.

The control system 100 can include a satellite communication system (SATCOM) 200. The SATCOM 200 can be configured to communicate with one or more satellites, such as geostationary satellites. In various examples, the SATCOM 200 may communication with one or more satellites via RF signals. The SATCOM 200 may also be configured to communicate with one or more ground stations.

The SATCOM 200 can, in various examples, be configured to provide internet and/or telephone connectivity to passengers, drivers, or pilots within the vehicle. For example, the SATCOM 200 may provide connectivity to an IP-based packet-switched communications network, such a SWIFTBROADBAND (SBB).

The SATCOM 200 can include an antenna 210 and a modem 220. The antenna 210 can be configured to receive and transmit RF signals. The antenna 210 can be coupled to a body of the vehicle, such as the airframe of an aircraft. The antenna 210 of the SATCOM 200 can be in electrical communication with the modem 220. The modem 220 may be configured to transform RF signals received by the antenna 210 to a bitstream, and vice-versa. When the antenna 210 is operating, the antenna 210 may emit RF signals.

As will be discussed further, the SATCOM 200 can be configured to operate in a plurality of modes. The plurality of modes can include at least a high power mode, a low power mode, and an off mode. As will also be explained further, the mode of the SATCOM 200 can be automatically determined, or the automatic selection can be overridden and the mode of the SATCOM 200 can be manually selected by a user.

When the SATCOM 200 is operating in the high power mode, the strength of the RF signals emitted by the antenna 210 is greater than when the modem 220 is operating in the low power mode. Similarly, when the SATCOM 200 is operating in the low power mode, the strength of the radio frequency signals emitted by the antenna 210 is greater than when the modem 220 is operating in the off mode. In various examples, the antenna 210 does not emit RF signals when operating in the off mode. In various examples, the modem 220 of the SATCOM 200 is configured to control the mode of the SATCOM 200 and adjust the strength of the RF signals emitted by the antenna 210.

The SATCOM 200, such as the antenna 210 of the SATCOM 200, can be configured to receive traffic data 10. For example, the SATCOM 200 may receive traffic data 10 from at least one satellite and/or at least one ground station.

The traffic data 10 may include data indicative of a position of at least one other vehicle, such as at least one other aircraft. The data indicative of the position of the one or more other vehicles may include altitude data, latitude data, longitude data, global positioning system (GPS) coordinates, velocity data, or a combination thereof. The traffic data 10 may include identification data for each of the one or more other vehicles. For example, the identification data may include a transponder code (e.g., a "squawk" code), a tail number, or a combination thereof, for each of the one or more other vehicles.

The control system 100 can include a Traffic Alert and Collision Avoidance System (TCAS) 300. The TCAS 300 can include or be in electrical communication with a transponder 310. The TCAS 300 can be a vehicle collision avoidance system that may reduce the incidence of collision between the vehicle and another vehicle. The TCAS 300 may use the transponder 310 to detect and/or identify other vehicles. For example, the TCAS 300 may use the transponder 310 to receive traffic data 10 that is emitted by transponders of other vehicles. For example, the TCAS 300 may receive the altitude and transponder codes emitted by transponders of other vehicles, such as aircraft. The TCAS 300 can be configured to receive traffic data 10 from the transponders of other vehicles.

As will be discussed further, the TCAS 300 or the transponder 310 can be configured to receive or determine a position of the vehicle and determine a distance between the vehicle and at least one other vehicle. Alternatively or in addition to, the TCAS 300 or the transponder 310 can be configured to predict a distance between the vehicle and the at least one other vehicle at a time in the future. Alternatively or in addition to, the TCAS 300 or the transponder 310 can be configured to determine whether a distance between the vehicle and at least one other vehicle is or is predicted to be less than or equal to a threshold value (also referred herein as a "distance threshold value").

The control system 100 can include a data unit 400. The data unit 400 may be configured to receive or determine vehicle position data 20. The vehicle position data 20 may include data indicative of the current position and/or velocity of the vehicle. For example, the data unit 400 may receive vehicle position data 20 from a navigation management system 500, such as a flight management system. The navigation management system 500 may communicate with at least one satellite to receive or determine the vehicle position data 20. For example, the navigation management system 500 may communicate with the at least one satellite via open standard-precision signal L1OF/L2OF, obfuscated high-precision signal L1SF/L2SF, or a combination thereof.

As will be discussed further, the TCAS 300 or the data unit 400 can be configured to determine a distance between the vehicle and at least one other vehicle. Alternatively or in addition to, the TCAS 300 or the data unit 400 can be configured to predict a distance between the vehicle and the at least one other vehicle at a time in the future. Alternatively or in addition to, the TCAS 300 or the data unit 400 can be configured to determine whether a distance between the vehicle and at least one other vehicle is or is predicted to be less than or equal to a threshold value.

The control system 100 can include an input/output (I/O) system 600. The I/O system 600 can include a display 610. The display 610 may be a multi-function control and display 610 unit (MCDU), a primary flight display 610, a map display 610, a controller display 610, etc. In various examples, the I/O system 600 may include the data unit 400 such that the I/O system 600 may receive vehicle position data 20 and traffic data 10, and subsequently determine a distance between the vehicle and at least one other vehicle.

The display 610 can be configured to present the current operating mode of the SATCOM 200, the vehicle position data 20, which may include the current position of the vehicle, the traffic data 10, which may include the current position of at least one other vehicle, or a combination thereof. The I/O system 600 can be configured to emit audible indications that are associated with a distance between the vehicle and at least one other vehicle, the current operating mode of the SATCOM 200, a current operating mode of the control system 100, or a combination thereof.

The I/O system 600 can be configured to receive the vehicle position data 20, the traffic data 10, the SATCOM mode signal 30, which is data indicative of the current mode of the SATCOM 200, the control system mode signal 40, which is data indicative of the current mode of the control system 100, or a combination thereof. For example, the vehicle position data 20, the traffic data 10, and the SATCOM mode signal 30 may be received from the data unit 400 and/or the TCAS 300. In various examples, the i/o system 600 displays an indication and/or provides an audible indication of at least one of the vehicle position data 20, the traffic data 10, and/or the SATCOM mode signal 30. In various examples, the I/O system 600 may display 610 a mode of the control system 100, which may operate in an automatic mode (sometimes referred herein as an "auto mode") or an override mode. The I/O system 600 may display 610 a mode of the SATCOM 200, which may operate in a high power mode, a low power mode, and an off mode. As will be discussed further, the I/O system 600 may be configured to transmit a control system mode signal 40, which is data indicative of the control system 100 operating in the override mode or the auto mode, to the TCAS 300 or data unit 400. The TCAS 300 or the data unit 400 may transmit the override mode signal to the SATCOM 200.

When a vehicle, such as an aircraft, is operating, it may use vehicle position data 20 from its navigation management system 500 (e.g., a flight management system). As discussed, the navigation management system 500 may communicate with at least one satellite to receive or determine the vehicle position data 20, which may include the current position or velocity of the vehicle. However, RF signals emitted by other aircraft that are in the same vicinity may interfere with the navigation management system 500's ability to communicate with the at least one satellite. Therefore, this may negatively affect the operation of other systems within the vehicle that utilize the vehicle position data 20 from the navigation management system 500. For example, aircraft are often equipped with precision approach systems that utilize the vehicle position data 20 from its navigation management system 500. As such, the precision approach system of the aircraft may not operate correctly or as precisely when the navigation management system 500 is disrupted by the RF signals emitted by other aircraft. Therefore, it may be beneficial to adjust, automatically or manually, the strength of the RF signals emitted by the vehicle, such as emitted by the antenna 210 of the vehicle, when other vehicles are in the same vicinity, to prevent the interruption of the navigation management system 500 of the other aircraft.

Additionally, it may be necessary to periodically perform maintenance tests on SATCOM 200 units, which requires turning the SATCOM 200 on, which may emit RF signals that interfere with the navigation management systems of other vehicles. As such, it may be beneficial to provide an indication as to whether the SATCOM 200 may be turned on (and whether in a high power mode or in a low power mode) without interfering with the navigation management systems of other vehicles.

The control system 100 of the present disclosure may be configured to adjust the strength of the RF signals emitted by the antenna 210 of the SATCOM 200 of the vehicle, either automatically or manually. Additionally, or alternatively, the control system 100 of the present disclosure may be configured to provide an indication as to whether the SATCOM 200 may be turned on (and whether in a high power mode or in a low power mode) without interfering with the navigation management system 500 of other vehicles.

Referring still to FIG. 1, the control system 100 can include a SATCOM 200 that includes a modem 220 and an antenna 210, as discussed. The antenna 210 can be in electrical communication with the modem 220. The antenna 210 may emit RF signals when operating. For example, the antenna 210 may emit RF signals when communicating with or receiving communications from at least one satellite or ground station.

When the vehicle, such as an aircraft, is on the ground, the SATCOM 200 may be configured to be turned off to prevent RF signals from being emitted by the antenna 210, which may interfere with the navigation management systems of other aircraft. For example, the modem 220 of the SATCOM 200 may be turned off to prevent the RF signals from being emitted by the antenna 210. In various examples, however, turning off the SATCOM 200, or the modem 220 of the SATCOM 200, may be undesirable. For example, when a vehicle, such as an aircraft, is on the ground, a user, such as a pilot, a passenger, or a driver, of the vehicle may desire to use the antenna 210 to communicate with other individuals outside of the aircraft. In various examples, the vehicle may be an air ambulance and the pilot or passengers may desire to relay patient health status and/or continue communication with doctors or hospital staff. As such, turning the SATCOM 200 off may be detrimental for the safety of the patient on board the air ambulance. In various examples, passengers, pilots, or passengers may desire to use the SATCOM 200 for internet access, voice over IP calls, streaming services, etc. Turning the SATCOM 200 off may suddenly disconnect the passenger's connections of these SATCOM 200 services, which may result in decreased satisfaction of the user. As such, in various situations, it may be beneficial to operate the SATCOM 200 in a low power mode to allow users to continue use of the SATCOM 200, while also reducing the risk of the RF signals emitted by the SATCOM 200 interrupting the navigation management systems of other aircraft. When the SATCOM 200 is operating in the low power mode, basic data services are still available, but with a lower bandwidth, as compared to when the SATCOM 200 is operating in the high power mode. Also, when the SATCOM 200 is operating in the low power mode, the strength of RF signals emitted by the antenna 210 may be lower than when the SATCOM 200 is operating in the high power mode.

Referring now to FIGS. 2A-2D, various flow charts of methods 900 for operating the control system 100 are provided, in accordance with various embodiments. In various examples, the vehicle is an aircraft and the control system 100 is configured to determine that the vehicle is on the ground. In various examples, such as when the vehicle is a land craft, the control system 100 may not be configured to determine that the vehicle is on the ground, or the control system 100 may bypass this step.

As discussed, the control system 100 may include a navigation management system 500 that may be configured to determine vehicle position data 20, such as altitude data. The altitude data of the vehicle may be used to determine data that is indicative of the vehicle being on the ground. In various example, determining data indicative of whether the vehicle is on the ground can be determined by various other systems of the vehicle, such as a weight on wheels (WoW) system. The data unit 400 and/or the TCAS 300 may receive the data that is indicative of the vehicle being on the ground from the navigation management system 500 or any other system of the vehicle, such as the WoW system.

Referring to FIG. 2A, the control system 100 may be configured to determine whether a distance between the vehicle and at least one other vehicle is or is predicted to be less than or equal to a threshold value. Referring to FIG. 2B, the control system 100 may be configured to determine whether one or more distance(s) between the vehicle and all other vehicles within the vicinity is or is predicted to be greater than a threshold value. Stated differently, the control system 100 may be configured to determine that there are no other vehicles that are within the distance threshold. In various examples, the data unit 400 and/or the TCAS 300 may make the determination(s) based at least in part on received or determined traffic data 10. In various examples, the data unit 400 and/or the TCAS 300 may make the determination(s) based at least in part on received or determined vehicle position data 20.

For example, the traffic data 10 may be received from the SATCOM 200 and/or the transponder 310. The traffic data 10 may include the position of at least one other vehicle. For example, the traffic data 10 may include altitude data, latitude data, longitude data, global positioning system (GPS) coordinates, velocity data, or a combination thereof, of at least one other vehicle. The vehicle position data 20 may be received from the navigation management system 500. The vehicle position data 20 may include altitude data, latitude data, longitude data, global positioning system (GPS) coordinates, velocity data, or a combination thereof, of the vehicle, may be received from the navigation system.

The data unit 400 and/or the TCAS 300 may determine the current distance between the vehicle and at least one other vehicle and/or determine a predicted future distance between the vehicle and at least one other vehicle based at least in part on the traffic data 10 and the vehicle position data 20. The current distance and/or the predicted future distance can be compared to a threshold value.

In various examples, the threshold value is predetermined. In various examples, the threshold value is determined by the data unit 400 and/or the TCAS 300 based at least in part on at least one RF property emitted by the antenna 210 of the SATCOM 200. For example, at least one RF property may be the amount of gain achievable by the antenna 210. As will be appreciated, antennas are often categorized as high gain antennas (HGA) or low gain antennas (LGA). At least one RF property may be the RF waveform emitted by the antenna 210. As will also be appreciated, antennas are often configured to emit various different types of waveforms including a C1 waveform, C2 waveform, C8 16APSK waveform, 2C8 APSK waveform, C8 CPSK waveform, 2C8 QPSK waveform, etc. As will also be appreciated, certain types of RF properties of antennas may require a greater distance between the vehicle and another vehicle to prevent the interruption of the navigation management system 500 on the other aircraft, which corresponds to the threshold value. For example, an LGA emitting a C2 waveform would require less of a distance than a HGA antenna 210 emitting a 2C8 APSK waveform. As such, the threshold value for the LGA emitting a C2 waveform would be less than the threshold value for the HGA antenna 210 emitting a 2C8 APSK waveform. In various examples, the threshold value is between 30 feet and 700 feet, such as between 35 feet and 500 feet, such as between 300 feet and 450 feet.

The data unit 400 and/or the TCAS 300 may compare the current distance and/or the predicted future distance between the vehicle and at least one other vehicle against the threshold value. When the current distance and/or the predicted future distance is less than or equal to the threshold value, the control system 100 may send a determined SATCOM mode signal 30 to the SATCOM 200 to automatically switch or maintain the SATCOM 200 in a low power mode, as depicted in the flow chart of FIG. 2A. When the current distance and/or the predicted future distance is greater than the threshold value, the control system 100 may send a determined SATCOM mode signal 30 to the SATCOM 200 to automatically switch or maintain the SATCOM 200 in a high power mode, as depicted in the flow chart of FIG. 2B.

Referring to FIG. 2C, the automatic switching of the SATCOM 200 between the low power mode and the high power mode by the control system 100 may be overridden. For example, a user, such as a pilot or a driver, of the vehicle may select the desired mode of the SATCOM 200 via the display 610, which causes an override SATCOM mode signal 30, which is data indicative of the desired mode of the SATCOM 200, to be transmitted to the data unit 400 and/or the TCAS 300.

Referring to FIG. 2D, when the vehicle is an aircraft, the control system 100 may prevent the SATCOM 200 from switching from a high power mode to a low power mode when the aircraft is not on the ground (i.e., the aircraft is in flight). The control system 100 may automatically switch the SATCOM 200 from the high power mode to the low power mode when it is determined that the aircraft is on the ground (i.e., after the aircraft has landed). In various examples, the control system 100 may automatically switch the mode of the control system 100 to the auto mode and the mode of the SATCOM 200 can be switched automatically, as previously described.

Referring now to FIG. 3A, a view of at least a portion of a graphical user interface (GUI) of the display 610 is provided, in accordance with an example embodiment. The GUI of the display 610 can present an auto override control 620. The auto override control 620 can be configured to allow a user to select between an auto mode and an override mode ("Off" mode as depicted) of the control system 100. The auto mode causes the TCAS 300 and/or the data unit 400 to automatically switch the SATCOM 200 from the high power mode to the low power mode when it is determined that a distance between the vehicle and at least one other vehicle is or is predicted to be less than or equal to a threshold value. In various examples, the auto mode causes the TCAS 300 and/or the data unit 400 to automatically switch the SATCOM 200 from the low power mode to the high power mode when it is determined that a distance between the vehicle and at least one other vehicle is or is predicted to be greater than a threshold value.

In contrast, the override mode causes the TCAS 300 and/or the data unit 400 to not automatically switch the SATCOM 200 mode. When the vehicle is an aircraft, the auto override control 620 may only be made visible or selectable when the aircraft is determined to be on the ground. As such, the control system 100 may be configured to prevent (or not allow) the SATCOM 200 from switching from the high power mode to the low power mode when the aircraft is not on the ground.

The GUI of the display 610 can present a SATCOM mode control 630. The SATCOM mode control 630 can be configured to allow a user to select between the SATCOM 200 operational modes (i.e., high power mode, low power mode, or off mode). Stated differently, the SATCOM mode control 630 can be a means for a user to switch the SATCOM 200 from one SATCOM 200 operational mode to another SATCOM 200 operational mode. When the vehicle is an aircraft, the SATCOM mode control 630 may only be made visible or selectable when the aircraft is determined to be on the ground. Selection of one of the SATCOM 200 operational modes may cause an override SATCOM mode signal 30, which is data indicative of the selected SATCOM 200 operational mode, to be transmitted to the TCAS 300 and/or the data unit 400. The TCAS 300 and/or the data unit 400 may transmit the override SATCOM mode signal 30 to the SATCOM 200, which may cause the SATCOM 200 to switch between one of the high power mode, the low power mode, or the off mode to another one of the high power mode, the low power mode, or the off mode.

Referring now to FIG. 3B, the GUI of the display 610 can present an alert indication 640. The alert indication 640 may notify the user of the GUI, such as a pilot or a driver of the vehicle, that the SATCOM 200 operational mode is currently set to the high power mode and that a vehicle is, or is predicted to be, within the distance threshold value. The alert indication 640 may provide letters, icons, or the like that are brighter colors or bolder than the other portions of the GUI that are provided. In various examples, the alert indication 640 may flash. Alternatively or in addition to, the alert indication 640 may be an audible indication emitted by the I/O system 600.

Referring now to FIG. 4, a view of at least a portion of a GUI of the display 610 is provided, in accordance with an example embodiment. The GUI may present a SATCOM mode annunciation 650. The SATCOM mode annunciation 650 may provide an indication regarding the current mode of the SATCOM 200 and/or the control system 100. For example, the SATCOM mode annunciation 650 may provide an indication of "SATCOM 200 ON" or "SATCOM 200 OFF". In various examples, the SATCOM mode annunciation 650 may provide an indication of "SATCOM 200 HIGH" or "SATCOM 200 LOW". When the control system 100 is operating in an auto mode, the SATCOM mode annunciation 650 may provide an indication of "SATCOM 200 AUTO"

Additionally, the SATCOM mode annunciation 650 may provide an indication regarding whether there are other vehicles that are within the distance threshold. For example, when another vehicle is not within the distance threshold, the SATCOM mode annunciation 650 may provide a first icon or may change the color of the SATCOM mode annunciation 650 to a first color, such as yellow, blue, or a combination thereof (e.g., green). In contrast, when another vehicle is within the distance threshold, the SATCOM mode annunciation 650 may provide a second icon or may change the color of the SATCOM mode annunciation 650 to a second color, such as red, yellow, or a combination thereof (e.g., orange).

Referring now to FIGS. 5A and 5B, views of at least a portion of a GUI of the display 610 is provided, in accordance with an example embodiment. In various examples, the GUI may present an effectivity ring 660. The radius of the effectivity ring 660 may be indicative of the distance threshold value. For example, when no aircraft are within the effectivity ring 660, as depicted in FIG. 5A, the effectivity ring 660 may be displayed in a first color, such as yellow, blue, or a combination thereof (e.g., green). When another vehicle is within the distance threshold, as depicted in FIG. 5B, the effectivity ring 660 may be displayed in a second color, such as red, yellow, or a combination thereof (e.g., orange).

In various examples, and as depicted in FIGS. 5A and 5B, the GUI may provide a SATCOM mode annunciation 650 and control 670. The SATCOM mode annunciation 650 and control 670 can serve the functions of both the SATCOM mode control 630, as discussed in reference to FIGS. 3A and 3B, and the SATCOM mode annunciation 650, as discussed in reference to FIG. 5A. Stated differently, the SATCOM mode annunciation 650 and control 670 may provide an indication regarding whether there are other vehicles that are within the distance threshold and can also allow a user to select between the SATCOM 200 operational modes (i.e., high power mode, low power mode, or off mode). Further, the SATCOM mode annunciation 650 and control 670 may allow a user to select between the modes of the control system 100 (e.g., auto mode or override mode).

As will be appreciated, the control system 100 of the present disclosure has various benefits. For example, the control system 100 of the present disclosure may prevent the RF signals emitted by the vehicle from interfering with the navigation management systems of other vehicles. For example, by switching the mode of the SATCOM 200, either manually or automatically, from a high power mode to a low power mode, the strength of the RF signals emitted by the antenna 210 of the SATCOM 200 is reduced. As such, this reduces the likelihood that the RF signals emitted by the antenna 210 of the SATCOM 200 will interfere with the navigation management systems of other vehicles.

Additionally, and will also be appreciated, the control system 100 of the present disclosure allows the use of the SATCOM 200 for communication purposes when the SATCOM 200 is switched to the lower mode. As previously explained, switching the SATCOM 200 of the vehicle to the low power mode still allows for the use of basic data services, such as communication services. As such, when the vehicle is an ambulance, such as an air ambulance, passengers, drivers, or pilots of the vehicle may still communicate with hospitals or doctors to regarding a patient, which may increase the safety of the patient.

Although components and methods of the control system 100 are often described with respect to functional limitations, it should be understood that the particular implementations necessarily include the use of particular computing hardware. For example, at least one processor may be included within the control system 100 that provides processing functionality, memory may be included within the control system 100 that provides storage functionality, and communications circuitry may be included within the control system 100 that provides interface functionality to any of the components of the control system 100.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A control system for controlling an antenna of a vehicle, the control system comprising:

a satellite communication system (SATCOM) comprising the antenna, wherein the antenna emits RF signals, and wherein:

the SATCOM is configured to operate in a plurality of modes, wherein the plurality of modes comprises a low power mode and a high power mode, a strength of the RF signals emitted by the antenna is greater when the SATCOM is operating in the high power mode than when the SATCOM is operating in the low power mode, and the control system is configured to;

determine whether the vehicle is on the ground or not on the ground, and switch the SATCOM from the high power mode to the low power mode when (i) it is determined that the vehicle is on the ground and (ii) a distance between the vehicle and at least one other vehicle is or is predicted to be less than or equal to a threshold value.

2. The control system of claim 1, wherein the control system is further configured to determine or predict the distance between the vehicle and the at least one other vehicle based at least in part on vehicle position data and traffic data, and wherein the threshold value is determined at least in part on at least one RF property of the RF signals emitted by the antenna.

3. The control system of claim 1, wherein the control system is configured to switch the SATCOM from the low power mode to the high power mode when one or more distance(s) between the vehicle and all other vehicles within a vicinity of the vehicle is or is predicted to be greater than the threshold value.

4. The control system of claim 1, further comprising an input/output (I/O) system, wherein the I/O system is configured to output an indication of a current operating mode of the SATCOM, wherein the I/O system comprises a display, and wherein the display is configured to present a SATCOM mode annunciation providing the indication of the current operating mode of the SATCOM.

5. The control system of claim 1, further comprising an input/output (I/O) system, wherein the I/O system is configured to allow input of a desired operating mode of the SATCOM.

6. The control system of claim 1, further comprising an input/output (I/O) system, wherein:

the control system is configured to operate in an auto mode and in an override mode, and the I/O system is configured to allow a user to select between the auto mode and the override mode of the control system, when the control system is operating in the auto mode, the control system is configured to automatically switch the SATCOM from the high power mode to the low power mode based on the distance between the vehicle and the at least one other vehicle, wherein when the control system is operating in the override mode, the control system does not automatically switch the SATCOM, wherein when the control system is operating in the override mode, the control system is configured to allow the user to select between the high power mode and the low power mode of the SATCOM, and wherein an override SATCOM mode signal indicative of the user's selection is transmitted to the SATCOM to switch between the high power mode and the low power mode.

7. The control system of claim 1, further comprising an input/output (I/O) system, wherein the I/O system is configured to provide an alert indication when the SATCOM is operating in the high power mode and the distance between the vehicle and at least one other vehicle is or is predicted to be less than or equal to the threshold value, wherein the alert indication is displayed on a graphical user interface (GUI) of a display of the I/O system.

8. The control system of claim 1, further comprising a modem that is in electrical communication with the antenna, wherein the modem is configured to adjust the strength of the RF signals emitted by the antenna based on an operating mode of the SATCOM, and wherein the modem is configured to control the operating mode of the SATCOM.

9. The control system of claim 1, wherein the control system is configured to determine the threshold value at least in part on at least one RF property of the RF signals emitted by the antenna.

10. The control system of claim 1, wherein the control system is configured to switch the SATCOM from the high power mode to the low power mode to prevent the RF signals emitted by the antenna from interfering with a navigation management system of the at least one other vehicle.

11. The control system of claim 1, further comprising a Traffic Alert and Collision Avoidance System (TCAS) comprising a transponder, wherein the TCAS is configured to determine the distance between the vehicle and the at least one other vehicle based at least in part on traffic data received by the transponder.

12. The control system of claim 1, wherein the control system is configured to determine whether the vehicle is on the ground based at least in part on data received from a weight on wheels (WoW) system.

13. The control system of claim 1, further comprising a navigation management system configured to determine vehicle position data comprising altitude data, wherein the control system is configured to determine whether the vehicle is on the ground based at least in part on the altitude data.

14. The control system of claim 1, wherein the control system is configured to prevent the SATCOM from switching from the high power mode to the low power mode when the vehicle is not on the ground.

15. The control system of claim 1, further comprising an input/output (I/O) system comprising a display, wherein the display is configured to present an effectivity ring on a graphical user interface (GUI), and wherein a radius of the effectivity ring is indicative of the threshold value.

16. The control system of claim 1, wherein the SATCOM is configured to provide internet and/or telephone connectivity to passengers, drivers, or pilots within the vehicle, and wherein when the SATCOM is operating in the low power mode, basic data services are available with a lower bandwidth as compared to when the SATCOM is operating in the high power mode.

17. The control system of claim 16, wherein the SATCOM is configured to provide connectivity to an IP-based packet-switched communications network, and wherein the basic data services available when the SATCOM is operating in the low power mode comprise at least one of internet access, voice over IP calls, or streaming services.

18. An aircraft comprising:

a satellite communication system (SATCOM) comprising an antenna configured to emit RF signals, wherein:

the SATCOM is configured to operate in a plurality of modes, wherein the plurality of modes comprises a low power mode and a high power mode, a strength of the RF signals emitted by the antenna is greater when the SATCOM is operating in the high power mode than when the SATCOM is operating in the low power mode; and a control system that is configured to switch the SATCOM from the high power mode to the low power mode when a distance between the aircraft and at least one other aircraft is or is predicted to be less than or equal to a threshold value, wherein the control system is configured to determine the threshold value based at least in part on a separation distance at which the RF signals emitted by the antenna when the SATCOM is operating in the high power mode would interfere with the at least one other aircraft.

19. The aircraft of claim 18, wherein the control system is configured to switch the SATCOM from the high power mode to the low power mode when the aircraft switches from being not on the ground to being on the ground.

20. A method of controlling a satellite communication system (SATCOM) of a vehicle, the SATCOM comprising an antenna configured to emit RF signals, the method comprising:

determining or receiving vehicle position data;

determining or receiving traffic data;

determining a distance or predicting a future distance between the vehicle and at least one other vehicle based at least in part on the vehicle position data and the traffic data;

switching the SATCOM from a high power mode to a low power mode in response to determining that the distance or the predicted future distance is less than or equal to a threshold value;

determining whether the vehicle is on the ground or not on the ground; and switching the SATCOM from the high power mode to the low power mode in response to a determination that the vehicle is on the ground and a determination that the distance is less than or equal to the threshold value.

* * * * *